May 11, 1965  C. E. RICKARD  3,183,021
QUICK ASSEMBLY COUPLING AND PROCEDURE FOR MAKING
Filed July 24, 1961  4 Sheets-Sheet 1

INVENTOR.
Clyde E. Rickard
BY
HIS ATTORNEYS

INVENTOR.
Clyde E. Rickard
BY Green, McCallister, & Miller
HIS ATTORNEYS

May 11, 1965 C. E. RICKARD 3,183,021
QUICK ASSEMBLY COUPLING AND PROCEDURE FOR MAKING
Filed July 24, 1961 4 Sheets-Sheet 3

INVENTOR.
Clyde E. Rickard
BY *Green, McCallister & Miller*
HIS ATTORNEYS

INVENTOR.
Clyde E. Rickard
BY
HIS ATTORNEYS

United States Patent Office 3,183,021
Patented May 11, 1965

3,183,021
QUICK ASSEMBLY COUPLING AND
PROCEDURE FOR MAKING
Clyde E. Rickard, Pittsburgh, Pa., assignor to McDowell Manufacturing Company, Millvale, Pa., a corporation of Pennsylvania
Filed July 24, 1961, Ser. No. 126,079
2 Claims. (Cl. 285—5)

This invention relates to a fluid coupling and particularly, to a coupling for quickly connecting and disconnecting pipe members or sections which will provide a highly effective sealed joint, is flexible in its utilization, and can be easily manipulated by hand. A phase of the invention deals with procedure for making an improved coupling.

The coupling of the present invention is of a type suitable for temporary and semi-permanent pipeline connections, and may be termed an industrial type. In this connection, there has been a need for an improved coupling whose parts cannot be lost or mislaid, in the sense that they are carried by end portions of the pipe members, that will be adaptable to uneven contours, that will permit assembly and disassembly without axially-aligning the pipe members and, importantly, that is suitable for relatively thin-wall pipe or tubing members, that will provide a better securing of its parts on the pipe members, and that will assure a safe and secure joint for high pressure utilizations, such as in the neighborhood of up to about 600 p.s.i. I have been able to devise an improved coupling to meet this need and have developed an improved procedure for making it.

It has been an object of my invention to provide an inexpensive, strong and foolproof coupling of improved characteristics and of a simplified and better construction;

Another object has been to devise a fluid coupling which utilizes the adjacent end portions of pipe members or tubing sections that are to be joined or connected together, which provides reinforcing for such end portions, and whose parts have an improved, secure and foolproof mounted relation with end portions of the pipe members;

A further object has been to provide a coupling joint which can be assembled and disassembled by hand in a matter of seconds, and irrespective of a full axial alignment of the pipe members being joined;

A still further object has been to provide improved procedure for making a coupling construction;

These and other objects of my invention will appear to those skilled in the art from the following description, the drawings, and appended claims.

Figure 7:
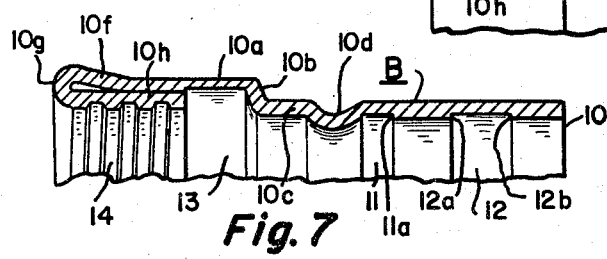
Figure 19:
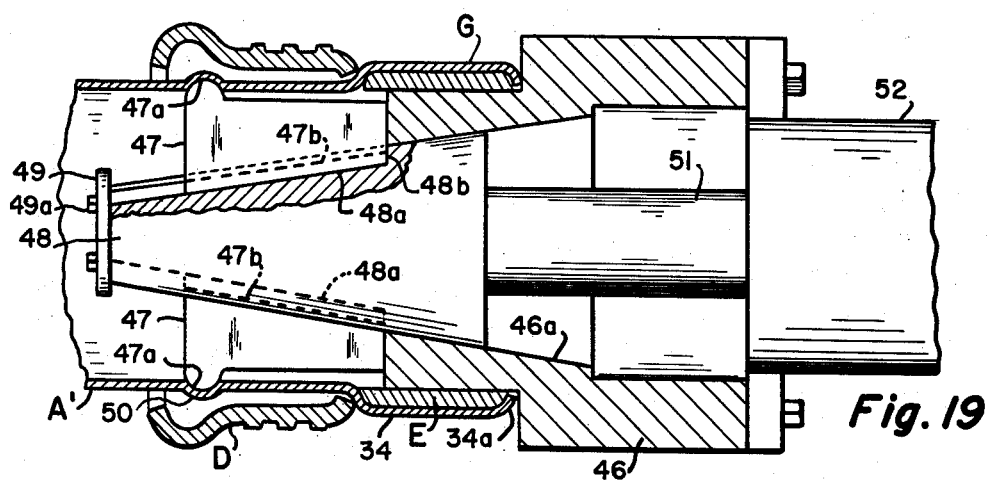
Figure 18:
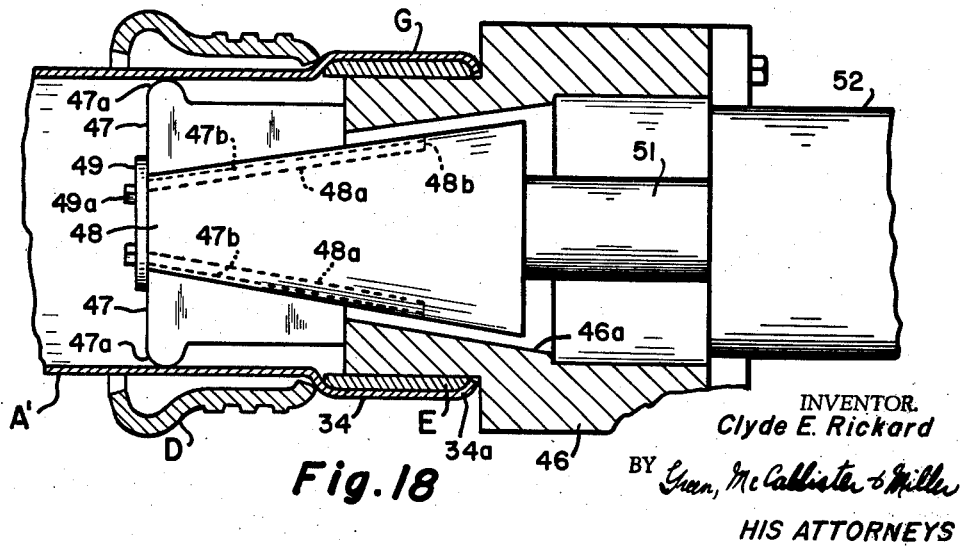

FIGURES 8 to 13, inclusive, are side section views in elevation illustrating steps employed in mounting the coupling housing body of FIGURE 7 on the end portion of a pipe member, and shows how the housing body is secured in a permanently mounted relation wherein it projects forwardly as an integral part of and in a reinforcing mounted relationship on the end portion of the pipe member;

FIGURES 14 to 17, inclusive, are side sections in elevation illustrating step by step procedure in forming a coupling tube or nose end portion on a pipe member for reinforcing such end portion;

FIGURES 18 and 19 are side sectional views in elevation illustrating the positioning of a coupling collar or sleeve nut on the coupling nose or tube end portion of a pipe member, and procedure involved in forming retaining means in the nature of dimples or radial offsets in the end portion that cooperate with a re-entrant shoulder of the coupling nose or tube end for maintaining the coupling nut in an operating position on the pipe member.

Figure 1:
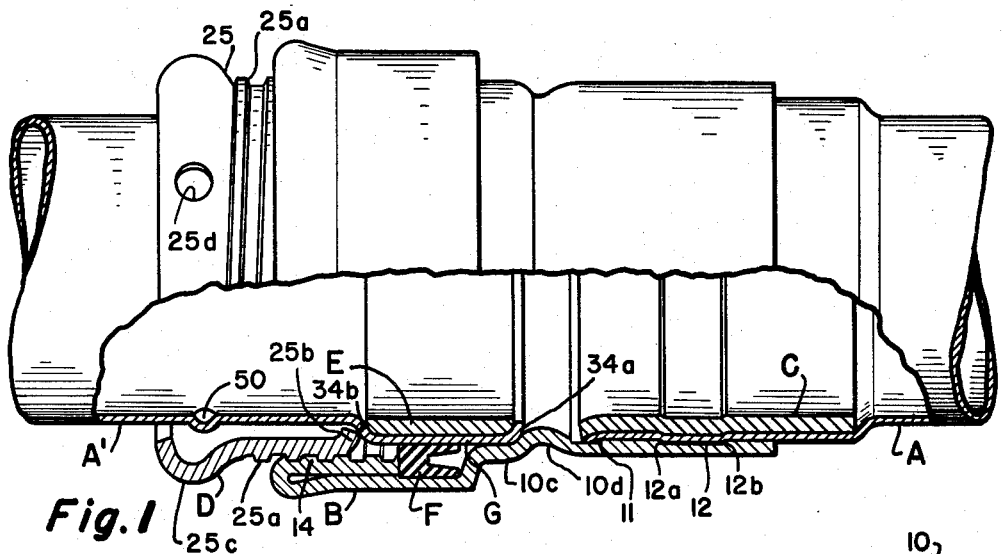
FIGURE 1 is a longitudinal view in elevation and partial section illustrating a coupling construction of my invention with its parts in a coupled relationship.

Referring particularly to FIGURE 1 of the drawings, my coupling construction is shown securely connecting adjacent end portions of a pair of pipe or tubing members A and A' in a secure and positive, fluid-sealed-off relationship with each other. In this connection, I may provide one end portion of each pipe member with a forwardly-projecting coupling housing body B and the opposite end portion of the same pipe member, or the adjacent end portion of an adjacent pipe member A' that is to be connected therewith, with a coupling nose or tube end G. The coupling permits an axially-pivotal or askew relationship between the adjacent end portions of the pipe members A and A' when they are being connected and disconnected and assures a fluid sealed-off relation even when they are coupled together in this relation, as well as when they are coupled together in a longitudinally-axially aligned relation with each other.

In FIGURE 1, I have shown a coupling collar or nut D which is provided with an external or male threaded portion having relatively coarse threads which are adapted to engage with complementary female threads on the inside of the housing body B. The connection between the housing body B and the end portion of the pipe member A is reinforced by an inner thickened sleeve or ring part C, while the nose or coupling tube end G of the pipe member A' is reinforced by an inner thickened ring or sleeve part E. A U-shaped resilient annular gasket F of a suitable resin material, such as nylon, is adapted to be carried within an inner peripheral recess or banding portion of the housing body B and, in such a manner, that it is always in a ready position to engage the nose or tube end portion of the adjacent pipe member A' to define a fluid seal therewith. The fluid-sealing action is increased proportionately to the fluid pressure, since fluid flows within the inner chamber defined by opposed legs or sealing lips of the gasket F when fluid pressure is applied, to spread such legs into tight sealing-engagement between opposed cylindrical surfaces of the housing body B and the tube end G.

Figure 2:
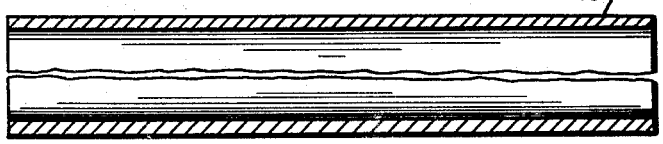
FIGURES 2 to 7 are fragmental side sections in elevation illustrating steps employed in forming a short length of pipe or tubing into a coupling housing body.
Figure 3:
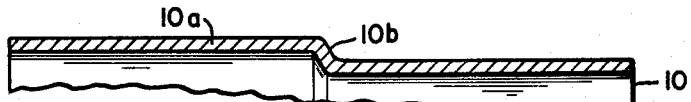

In providing the housing body B, as shown in FIGURE 2, I may make use of a relatively heavy or thick-walled, short-length tube or cylindrical member 10. In the first operation illustrated in FIGURE 3, the wall of the forward open end portion of the tube member 10 is expanded-out to provide a radially-outwardly-offset cylindrical forward open end portion 10a and a re-entrant shoulder 10b connecting it with the adjacent unexpanded cylindrical back end portion thereof of smaller diameter.

Figure 4:
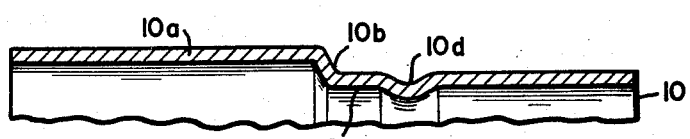
Figure 5:
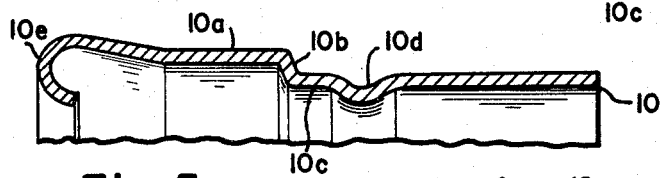

In the second step as illustrated in FIGURE 4, I roll-in a radially-inwardly projecting annular groove portion 10d in a backwardly-spaced relation with the re-entrant shoulder portion 10b to provide an intermediate cylindrical portion 10c of the same diameter as the original member 10 and thus, of the back end portion. In the next operation illustrated in FIGURE 5, the forward end portion 10e of the enlarged or expanded portion 10a is turned-inwardly in a preliminary manner.

Figure 6:
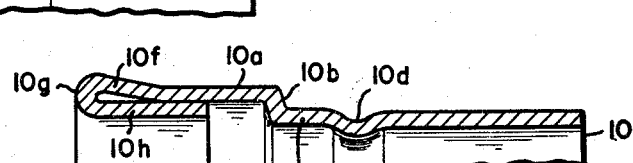

In the final operation illustrated in FIGURE 6, the portion 10e is lengthened and forced inwardly-backwardly along the portion 10a to provide a cylindrical inside fold portion 10h and a double-wall thickness. As illustrated, the portion 10h is provided by turning-in the end portion 10e and flattening it against the inner periphery of the portion 10a. This produces a radially-outwardly inclined end portion 10f that is connected to the cylindrical portion 10a, and a rounded abutment or flange end portion 10g that is connected between the inclined portion 10f and the doubled-under cylindrical portion 10h.

In the operation of FIGURE 7, female threads are cut along the portion 10h and groove portions 11, 12 and 13 are formed, as by machining, within the inner periphery of the wall of the member 10 to define annular banding grooves. As will be noted from FIGURE 1, each of these groove portions has a substantially rectangular base in section. The portion 13 serves as a retaining poriton for the resilient annular basket F and the portions 11 and 12 serve as longitudinally spaced-apart lock-mounting grooves for the end portion of a pipe member, such as A. As also illustrated in FIGURE 1, the groove 12 defines a pair of opposed sharp edges 12a and 12b, while the groove 11 defines a sharp edge 11a that are employed as shear-lock edges in mounting the pipe; they receive outwardly-expanded portions of member A and its reinforcing ring sleeve C (see FIGURE 13).

Figure 8:
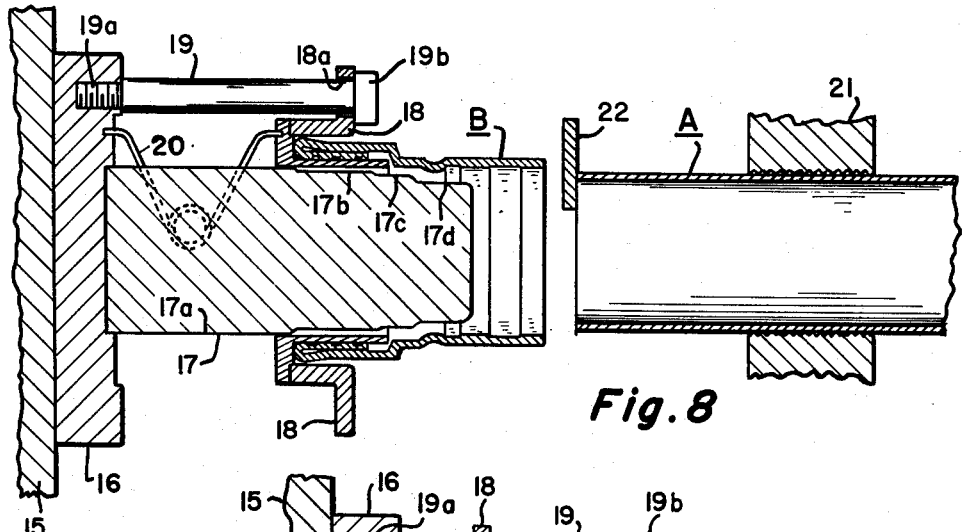

In FIGURE 8 I have shown an indexing head which may carry a group of forming punches in a spaced circular relation along its face to progressively and individually effect forming operations by turning the indexing head 15 to align the individual punches with parts being received and formed. In the operation of FIGURE 8, the indexing head 15 is shown having a mounting member 16 carrying a punch 17 for expanding an end portion of the pipe member A outwardly into position within the housing body B. It will be noted that the punch 17 has a series of forwardly-stepped cylindrical portions 17b, 17c and 17d that have progressively decreased diameters with respect to the main body diameter 17a of the punch.

In preparation for the operation of FIGURE 8, the forward, doubled-under open end portion of the housing body B is slid within the forward opening of an angle-shaped position-limiting assembly 18. The assembly 18 has a group of holes 18a through its vertical flange to slidably position it on a series of peripherally-spaced-apart bolts 19. The bolts 19 are secured at their threaded ends 19a on the mounting 16 to project forwardly therefrom and slidably receive the assembly 18.

Figure 9:
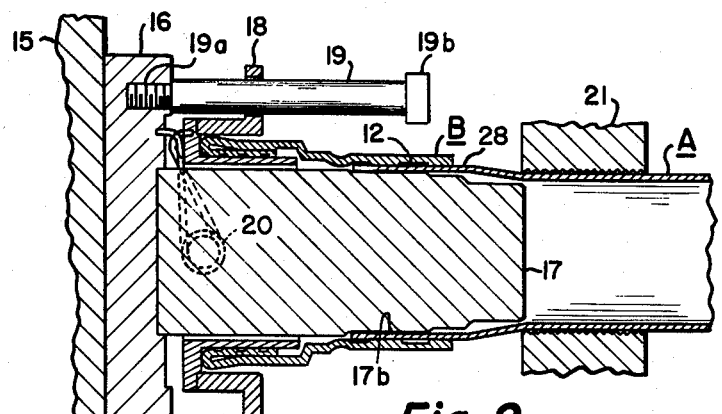

The assembly 18 is normally urged to the forward position of FIGURE 8 in abutment with heads 19b of the bolts 19 by a U-shaped tension spring 20 that is secured at its ends between the mounting 16 and the assembly 18. The end portion of the pipe member A that is to be mounted with respect to the housing body B may, as shown in FIGURE 8, be carried by partible parts of a gripper 21 and moved to an aligned relation with the back end portion of the coupling body B into abutment with a position stop gauge 22. Then, as shown in FIGURE 9, the stop 22 is raised and the punch and housing body assembly are moved longitudinally-endwise to move the back end portion of the housing body B over the end portion of the pipe member and thus, the end portion of the pipe member within the back open end portion of the housing body B and, at the same time, compressing the spring 20 and sliding the assembly 18 to its backmost position. This causes the face 17b of the punch 17 to radially-outwardly expand the end portion 28 of the pipe member A into a tight-expanded relationship within the back or mounting end portion of the housing body B.

Figure 10:
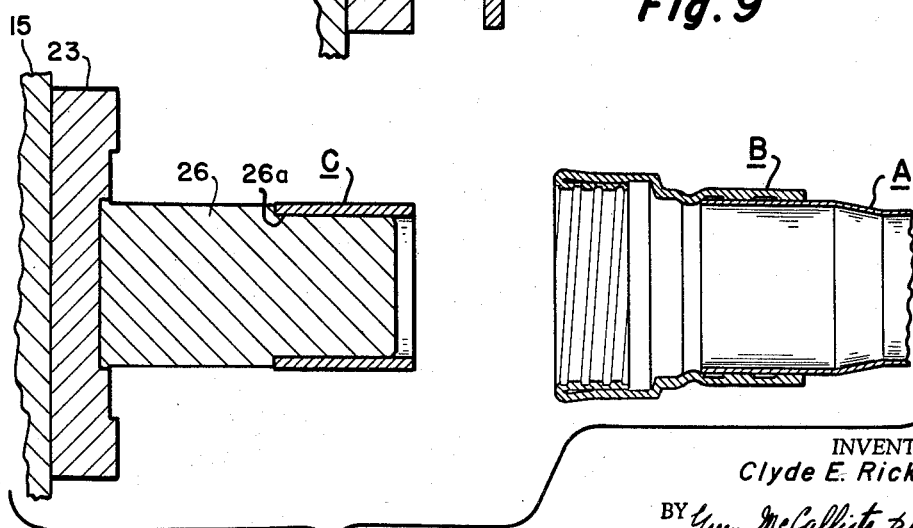

In the next step of FIGURE 10, I have shown a mounting 23 which also may be carried on the same indexing head 15, as carrying a punch 26 that has a forwardly-offset smaller diameter portion 26a. A reinforcing sleeve or ring C is slid endwise on the portion 26a and the punch 26 is then driven endwise or axially-longitudinally within the assembly provided by the step of FIGURE 9 and which is being held by the gripper 21, see the position indicated in FIGURE 11. This operation aligns the reinforcing sleeve C in its proper position in the expanded portion 28 of the pipe member A and with respect to the banding grooves 11 and 12.

Figure 11:
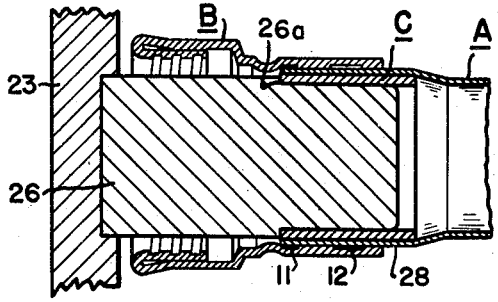
Figure 12:
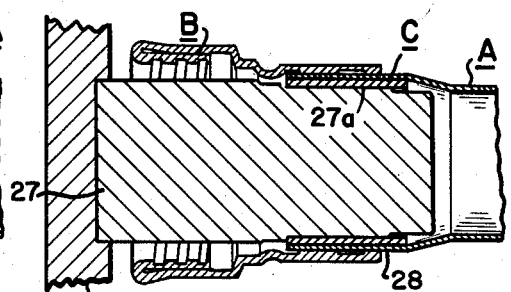

In the operation of FIGURE 12, I have shown a mounting 24 for a third punch 27 on which the pipe end assembly of FIGURE 11 is moved axially. The punch 27 has an offset cylindrical portion of smaller diameter 27a which is employed to radially expand the reinforcing ring C, the open end portion of the pipe member A, and the open end mounting portion of the coupling housing body outwardly together about 3 percent.

Figure 13:
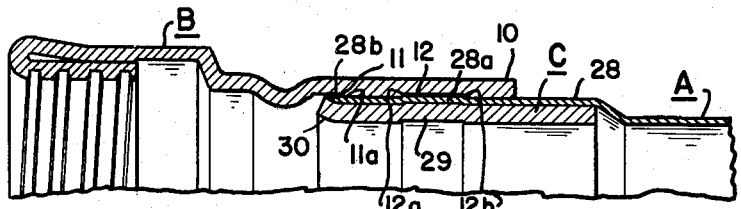

In the next step of FIGURE 13, a punch of slightly larger diameter introduced through the front end portion of the housing body B is employed to radially-outwardly expansion-deform or displace full wall thickness portions or areas of both the forward expanded-out portion 28 of the pipe member A and of the reinforcing part C into the grooves 11 and 12 of the housing body B. This produces a slightly outwardly-offset latching-banding portion 29 in the sleeve C in alignment with the groove portion 12. A forwardly-sloped annular shoulder or enlarged portion on the punch is employed to turn-in end or flange edge portion 30 in alignment with the groove portion 11. In addition, an outwardly-offset full wall thickness portion 28a of the pipe member A is moved into the groove portion 12 and an end or flange edge portion 28b is moved into the groove portion 11. The edge 11a of the groove portion 11 provides a lock shear edge directly with the portion 28b of the pipe member A and indirectly with the portion 30 of the ring portion C. The opposite edges 12a and 12b of the groove portion 12 provide spaced-apart lock shear edges with the portion 28a of the pipe member A and thus, indirectly with the portion 29 of the reinforcing sleeve C. If desired, a roller-expanding or peening tool of a general type shown in the Hempel Patent No. 2,898,171 or the Wallace Patent No. 2,835,309 may be employed for providing the portions 28a and 29.

Figure 14:
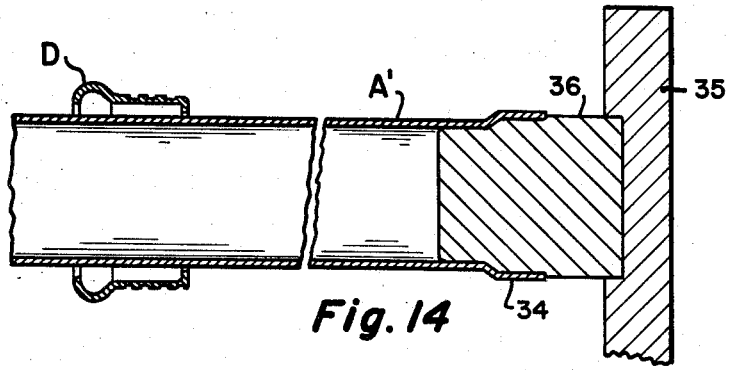

In FIGURE 14, I prefer to first slide an annular lock nut or collar D on the end portion of an adjacent pipe member A' which is to be employed as the tube or nose end part of the coupling. After this has been done, I employ a punch 36 carried by a mounting 35 which also may be carried on an indexing head, such as described above. The punch is driven endwise into the end of the pipe member A' to form a radially-expanded-out open end portion 34.

Figure 15:
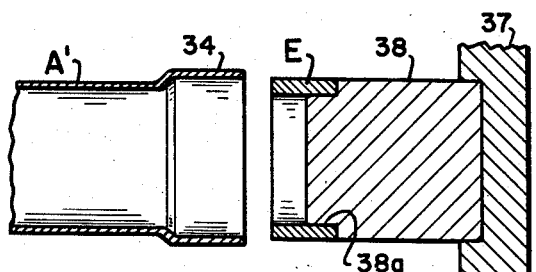
Figure 16:
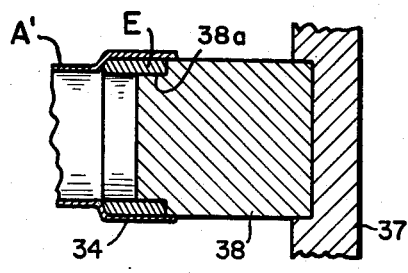
Figure 17:
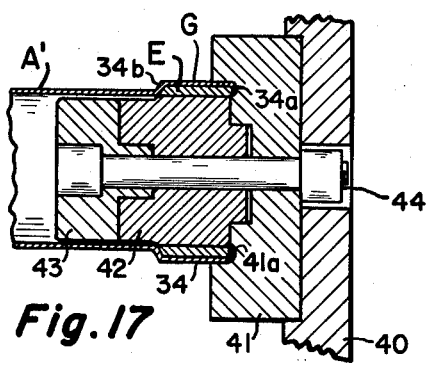

In the next step illustrated in FIGURES 15 and 16, a second punch 38, which is positioned on mounting 37, is used to carry a reinforcing ring or sleeve E on its end portion 38a of reduced diameter to an endwise forced-in position within the expanded portion 34 (see FIGURE 16). For the third operation of FIGURE 17, I have shown a punch and die assembly 41, 42 and 43, secured on mounting 40 by a mounting pin 44. The punch part 42 of the assembly has an enlarged cylindrical back portion which, as shown in FIGURE 17, not only expands the reinforcing ring E into the offset wall portion 34, but cooperates with a forwardly-grooved or stop portion 41a of die part 41 to turn-in or flange-inwardly the end or edge 34a of the pipe member A'. It will be noted that a re-entrant shoulder 34b and the turned-in flange 34a define opposed spaced-apart locking edges for the opposite edges or ends of the ring E. This completes the forming of the tube or nose end of the coupling, except for providing means to retain the lock nut D in an operative position on the pipe member A'.

In FIGURES 18 and 19, I have shown steps of radially-outwardly expanding a wall area to provide annularly-aligned, radially-opposed and peripherally spaced-apart dimples 50 in the wall thickness of the pipe member A' behind its coupling nose or tube end portion G. This means comprises a series of substantially rectangular-shaped tap keys 47 which extend radially-outwardly and have rounded lug or pin ends 47a at their extreme forward end portions which displace or form dimples 50 in the wall of the pipe member A'. Each key 47 has a T-shaped, inclined, bottom or inner end portion 47b which is slidably-positioned in complementary slots 48a carried by a cone-shaped mandrel 48. An end closure plate 49 is secured by bolts 49a on the end of the mandrel 48 to limit the forward advance of the keys 47 along forwardly-declining slot or groove portions 48a.

In FIGURE 18, when the keys are in a forward-abutting relationship with the plate 49, they are in their inoperative positions in which they are inserted within and removed from the open end portion of the pipe member A'. The mandrel 48 is carried by a shaft 51 which extends backwardly therefrom and is positively advanced and retracted by a fluid motor 52 to move the mandrel from its back position of FIGURE 18 to its forward position of FIGURE 19, and thus advance the keys 47 along their slides into abutment with back end stop portions 48b, at which time, the dimples 50 are formed. Upon the completion of the dimpling operation, the motor 52 then retracts the mandrel 48 so that the assembly may be removed.

A guide housing or mounting 46 is adapted, as shown in FIGURES 18 and 19, to fit within the reinforcing ring E and has a forwardly-converging cone-shaped bore 46a within which the mandrel 48 is adapted to move and by which it is limited as to its maximum forward position of FIGURE 19. When the dimples 50 have been formed, the entire tool assembly, including the guide mounting 46, is withdrawn from within the nose or tube end G of the pipe member A'. It will be noted that the dimples 50 permit a certain amount of free, longitudinally-axial movement of the coupling nut D, but at the same time, retain it in an operative position thereon, so that it is always ready for assembling the coupling. The nut D, by reason of its in-turned front end flange portion 25b of smaller inner diameter, cannot move backwardly past the dimples 50 and cannot move forwardly past them by reason of the abutment of such flange portion 25b with an annular re-entrant shoulder 34b of the outwardly-expanded-out portion 34 of the pipe member A'. It will be noted that the outer diameter of the dimples 50 and of the re-entrant shoulder 34b is greater than the inner diameter of the flange 25b.

As shown in FIGURE 1, the coupling nut D has a cylindrical portion 25 provided with relatively coarse male threads 25a which terminate at the in-turned, flange end portion 25b. Although the nut D may normally be secured in position and loosened to assemble and disassemble the coupling by manually gripping its rounded shoulder portion 25c, I have shown radial holes 25d through the portion 25c within which a nail or lever pin may be inserted to facilitate its turning action, if and when desired.

If desired, before the pipe member A is inserted within the housing body B. A cement such as a mastic, may be painted within the banding portion 12 to insure a full fluid-seal between the parts A and B, irrespective of any irregularity, such as scratches. However, the forming and assembling operations are such that a highly mechanically-secure joint is provided between the parts A and B, such that they will withstand a bursting pressure of about 1800 p.s.i., thus making the coupling suitable for fluid pressures of up to about 600 p.s.i. A locked, tight secured relationship is attained irrespective of whether or not a cement is used at the portion 12.

It will be apparent that the coupling collar or nut D may be formed from a short length tubing piece or member of cylindrical shape. The outwardly-projecting rounded shoulder 25c may be formed by expanding and slightly bending its back edge portion, and the in-turned forward flange 25b may be formed by turning the forward edge of the piece or member radially-inwardly. The cylindrical portion 25 may constitute the original diameter of the tube member and the relatively coarse threads 25a may be machined on its outer periphery to provide threads that are complementary with the threads 14 of the coupling housing body B.

With particular reference to FIGURE 1, the cylindrical portion 10c and the annular inwardly-projecting shoulder 10d provide a pivotal, position-retaining joint for the rounded in-turned flange portion 34a of the nose part G, such that axial-pivotal movement is permitted between the adjacent ends of the pipe members A and A' that are to be connected together. The construction is such that the pipe members may be tightly secured together in an askew relationship at their adjacent ends to allow for irregular contour of the ground on which they are laid. Irrespective of whether the adjacent end portions of the pipe members making up the joint are fully longitudinally-axially aligned, as shown in FIGURE 1, or have a somewhat askew relationship, they are securely held in position in a foolproof manner by my construction and with a positive sealing relationship by the gasket F.

The coupling construction of my invention is easy to install and operate, being highly suitable for portable supply lines over land of uneven contour. The union connection action at the joint provides flexibility and when desired a particular pipe length or section can be quickly and easily removed without disturbing the rest of the line, since each coupling assembly provides a separate break joint. There are no lugs, latches or other gadgets to break off, jam or wear, or loose parts to pick-up or assemble and become misplaced. The gasket may be of a suitable resilient resin which is oil resistant, so that the coupling can be used for gas and oil lines. The gasket F fits snugly within the coupling housing body B and will not dislodge during transportation, installation or disassembly.

Employing my coupling construction, a joint can be connected and disconnected in a fraction of the time required with a conventional coupling. Assembly is accomplished by inserting the tube end G in the coupling housing body B and then screwing-in and tightening-down the coupling nut D. The average assembly time for a two-man crew averages 2 to 15 seconds per joint, while disassembly is even faster. The lines utilizing my coupling have been employed for temporary or semi-permanent portable lines for transporting petroleum products, gas, water, steam, compressed air, mud, etc.

The tube end G is self-centering and the cooperating nut and coupling threads are somewhat widely spaced and coarse, so that assembly can be effected even when the ends of the pipe members are in a somewhat askew relationship. The coupling parts serve to reinforce the ends of the pipe members and screw threads, welded, and nut types of joints between the coupling parts and the pipe members are made unnecessary. The construction is particularly suitable for the utilization of relatively thin-wall pipe members, in that reinforcing sleeves or collars are provided and have a secure, mechanically-locked mounting, by reason of the expansion fitting provided and the use of longitudinally-opposed, offset, spaced-apart, interfitting banding wall portions between the reinforcing sleeves or rings and the end portions of the pipe members.

What I claim is:

1. A high-fluid-pressure-withstanding coupling end construction for a first relatively thin wall metal pipe member of substantially uniform diameter along its length which is to be coupled with a nose end portion of a second pipe member of substantially the same diameter which comprises, a cylindrical radially-outwardly-expanded forward open-end portion on the first pipe member connected by an annular re-entrant shoulder to an adjacent back unexpanded portion thereof, a hollow open end coupling body of substantially greater wall thickness than the first pipe member having a forward radially-outwardly-expanded cylindrical open mouth portion carrying a doubled-under forward open end wall provided with internal threads therealong; said cylindrical open mouth portion being connected by a re-entrant shoulder, a cylindrical portion, and an annular radially-inwardly-projecting shoulder to an unexpanded cylindrical back mounting end portion of the coupling body; the inner side of said doubled-under forward open end wall extending along the inside of said cylindrical open mouth portion and terminating in an abutment edge that is spaced from said reentrant shoulder to provide a gasket-receiving recess therebetween; said back mounting end portion having a pair of annular banding grooves in a longitudinally spaced-apart relation in its inner periphery, the expanded-out forward open end portion of the first pipe member being positioned along and within the inner periphery of the mounting end portion of said coupling body, a reinforcing metal sleeve of substantially greater wall thickness than the first pipe member within and along the inner periphery of the expanded-out forward open end portion of the first pipe member in substantial alignment with the mounting end portion of said coupling body, and said reinforcing sleeve and the expanded-out forward open end portion of the first pipe member having outwardly-offset annular banding wall portions that interfit with each other in alignment with the banding grooves of the back mounting end portion, the annular banding wall portion of said first pipe member having shear locking edges engaging within the edges of the banding grooves of the back mounting end portion, said reinforcing sleeve having its back edge end in engagement with the re-entrant shoulder of the first pipe member and its forward edge end in flanging engagement with the forward end of the expanded-out forward open end portion of the first pipe member, and said annular radially-inwardly-projecting shoulder projecting radially-inwardly adjacent the forward end of the first pipe member to define a limit stop for the insertion of the nose portion of the second pipe member within the said cylindrical open mouth portion.

2. An improved nut-collar high-fluid-pressure-withstanding coupling construction for detachably connecting together adjacent open end portions of a pair of relatively thin-wall metal pipe members of substantially the same uniform diameter along their lengths, wherein the open end portion of one pipe member provides a metal nose part for the coupling and has a coupling nut positioned thereon adjacent its nose part, and the open end portion of the other pipe member carries a metal coupling body that projects forwardly therefrom to fit over the nose part and cooperate with the coupling nut carried by the one pipe member; the nose part comprising an expanded-out cylindrical open end portion of substantially greater wall thickness than and on the one pipe member, a reinforcing metal sleeve of substantially greater wall thickness than the one pipe member tightly engaging within the inner periphery of the expanded-out open end portion, a re-entrant shoulder between the end of the expanded-out open end portion and an adjacent unexpanded portion of the one pipe member, a radially-inwardly-turned annular flange on the outer end of the expanded-out portion, said annular flange and said re-entrant shoulder lock-engaging opposite ends of said reinforcing sleeve to securely hold it in position within the expanded-out portion and define the nose part for the coupling; a radially-expanded-out wall area in the one pipe member in a longitudinally-backwardly spaced relation with the expanded-out portion over which said reinforcing sleeve is positioned, said nut collar having a cylindrical wall provided with external threads extending from its forward end and having a forward radially in-turned flange of smaller inner diameter than the outer diameters of said radially-outwardly-expanded wall area and said re-entrant shoulder of the one pipe member, said nut collar being positioned on the one pipe member with its forward flange between said re-entrant shoulder and said radially-outwardly-expanded wall area to retain it in position on the one pipe member; said coupling body comprising a hollow tube member of substantially greater wall thickness than the one pipe member having a back mounting end portion and a radially-outwardly-expanded cylindrical forward coupling end portion with a doubled-under wall having internal threads corresponding to the threads on said coupling nut to engage therewith, said back mounting end portion having a pair of longitudinally spaced-apart banding grooves in its inner wall periphery; the other pipe member having a forward expanded-out open end portion defining a re-entrant shoulder with an adjacent back unexpanded portion thereof, a reinforcing metal sleeve of substantially greater wall thickness than the other pipe member positioned within the expanded-out open end portion of the other pipe member, said back mounting end portion of said coupling body being positioned over the expanded-out open end portion of the other pipe member, said second-mentioned reinforcing sleeve being in substantial alignment with the back mounting end portion of said coupling body and within the inner periphery of the expanded-out open end portion of the other pipe member, said second-mentioned reinforcing sleeve and the expanded-out open end portion of the other pipe member being expansion-locked within the back mounting end portion of said coupling body and having banding wall portions offset radially-outwardly into the banding grooves of the back mounting end portion, said coupling body having a cylindrical portion and an annular radially-inwardly-projecting shoulder between its re-entrant shoulder and its back mounting end portion defining a pivot joint for receiving said in-turned flange of the nose part and defining a limit stop for the insertion of the nose part within said coupling body, a resilient annular sealing gasket, and said coupling body having a banding groove in its inner periphery between its re-entrant shoulder and its doubled-under wall to carry said gasket for engagement with the expanded-out open end portion of the nose part.

References Cited by the Examiner
UNITED STATES PATENTS

| | | | |
|---|---|---|---|
| 609,030 | 8/98 | Keller | 285—382.5 |
| 1,057,664 | 4/13 | Patterson | 153—80 |
| 1,306,982 | 6/19 | Walsh | 153—80 |
| 1,918,715 | 7/33 | Robinson | 285—156 |
| 2,131,509 | 9/38 | Goepel | 285—382.4 |
| 2,485,960 | 10/49 | Donahue | 285—382.5 |
| 2,788,833 | 4/57 | Arnold | 285—382.2 |
| 2,916,306 | 12/59 | Rickard | 285—110 |
| 2,924,009 | 2/60 | Mazeika | 29—507 |
| 3,018,547 | 1/62 | Marskell | 29—507 |

FOREIGN PATENTS

| | | |
|---|---|---|
| 615,079 | 2/61 | Canada. |
| 455,785 | 3/50 | Italy. |
| 46,989 | 10/39 | Netherlands. |

CARL W. TOMLIN, *Primary Examiner.*
WHITMORE A. WILTZ, *Examiner.*

UNITED STATES PATENT OFFICE
CERTIFICATE OF CORRECTION

Patent No. 3,183,021                          May 11, 1965

Clyde E. Rickard

It is hereby certified that error appears in the above numbered patent requiring correction and that the said Letters Patent should read as corrected below.

Column 3, line 9, for "poriton" read -- portion --; line 10, for "basket" read -- gasket --; column 5, line 56, for "point" read -- joint --.

Signed and sealed this 21st day of September 1965.

(SEAL)
Attest:

ERNEST W. SWIDER                      EDWARD J. BRENNER
Attesting Officer                       Commissioner of Patents